Aug. 10, 1948.  P. T. SPROUL  2,446,674
CATHODE-RAY DEVICE MOUNTING
Filed Feb. 18, 1944  4 Sheets-Sheet 1

INVENTOR
P. T. SPROUL
BY
Walter C. Kiesel
ATTORNEY

Aug. 10, 1948.  P. T. SPROUL  2,446,674
CATHODE-RAY DEVICE MOUNTING
Filed Feb. 18, 1944  4 Sheets-Sheet 2

INVENTOR
P. T. SPROUL
BY
Walter E. Kiesel
ATTORNEY

Aug. 10, 1948.                P. T. SPROUL                    2,446,674
                        CATHODE-RAY DEVICE MOUNTING
Filed Feb. 18, 1944                                    4 Sheets-Sheet 3

INVENTOR
P. T. SPROUL
BY
Walter C. Kiesel
ATTORNEY

Aug. 10, 1948.    P. T. SPROUL    2,446,674
CATHODE-RAY DEVICE MOUNTING
Filed Feb. 18, 1944    4 Sheets-Sheet 4

INVENTOR
P. T. SPROUL
BY
Walter C. Kiesel
ATTORNEY

Patented Aug. 10, 1948

2,446,674

UNITED STATES PATENT OFFICE 2,446,674

CATHODE-RAY DEVICE MOUNTING

Philip T. Sproul, Chatham, N. J., assignor to Bell Telephone Laboratories, Incorporated, New York, N. Y., a corporation of New York Application February 18, 1944, Serial No. 522,907

13 Claims. (Cl. 250—164)

This invention relates to a mounting and indicatorscope for electronic beam devices and more particularly to such a mounting for cathode-ray devices.

An object of the invention is to facilitate the mounting of a cathode-ray tube or device from the panel of an enclosure casing in relation to a viewing opening therein.

Another object of the invention is to provide a mounting having shielding and cushioning attributes to protect the device from extraneous disturbances.

A further object of the invention is to improve the visual utility of the device by the provision of a multiple scope for the indication of electrical phenomena of large magnitude.

Another object of the invention is to selectively illuminate the multiple scale or scope of the device and increase the definition of the indication appearing on the scale.

A further object of the invention is to selectively control the indication or manifestation exhibited by the device on the scale and improve the visibility thereof.

A still further object of the invention is to enable clear differentiation between longitudinal survey and elevational indicia within the survey ranges.

These objects and other advantages are attained in accordance with this invention by partially enclosing the cathode-ray tube in a shell casing having a contour which substantially simulates the shape of the tube wherein the large diameter portion having the fluorescent screen on the end thereof it situated in a funnel-shaped metallic shell and a portion of the neck of the tube is surrounded by a cylindrical cup portion supporting the magnetic elements for deflecting, focussing and centering the electron beam within the tube. A socket is supported resiliently on the casing assembly and engages the terminal base of the tube. The open end of the casing adjacent the screen of the tube is secured to a panel support to affix the casing, tube, magnetic elements and socket within a cabinet enclosure so that the tube is suspended in the shell casing and the casing projects horizontally to the rear of the panel.

The open end of the shell casing is enclosed by a multirange indicator scale of transparent material formed of laminated layers and baffle separators and the casing is provided with a series of lamps around the periphery in staggered relation to cooperate with the edges of the laminated layers between the baffles to facilitate illumination of the different survey ranges intended to be indicated on the scale.

A feature of this scale or scope construction is the provision of multiple ranges desired to be viewed on the common coordinate scale of the scope. This is accomplished by superimposing several layers having central cut-out portions on a base layer and masking the edges of the cut-out portions so that illumination of a selected range is clearly identified with the common base scale.

Another feature of the invention relates to the selective control of the multiple range scope to vary the zones desired to be viewed so that each range is individually illuminated, whereby the selected range is luminous while the other ranges are obscured. This is accomplished by masking the inner edges of the superimposed layers of transparent material and separating the layers by opaque baffle rings having portions which form partitions between the staggered lamps mounted in marginal relation to the layers. In this manner the illumination of the selected range is terminated at the masked edge of the cut-out portion of the layer and the other ranges are obscured so that the desired range is accentuated with relation to the coordinate scale on which the fluorescent indication appears.

A further feature of the invention relates to the provision of multiple ranges of both longitude and elevation and the selective control incident to changing from one to the other to coordinate the range with the indications appearing on the scale. This is accomplished by switching operations which transfer the battery source to the lamp individual to the elevation range and thereby indicate the variations on the common scale with respect to azimuth.

Another feature involved in this invention relates to the provision of a visual signal on the multiple scope to indicate the limit of travel of a movable antenna utilized in the searching and tracking operation of the system associated with the cathode-ray device for producing localizing indications on the scope. This is accomplished by providing an opening in a masking disc covering the top layer of the scope and having a lamp illuminated by the antenna to indicate the travel thereof with respect to the limits of the common scale of the scope.

These and other features and advantages of the invention will be more clearly set forth in the following detailed description which together with the accompanying drawings comprise the disclosure of this invention.

Figure 1:
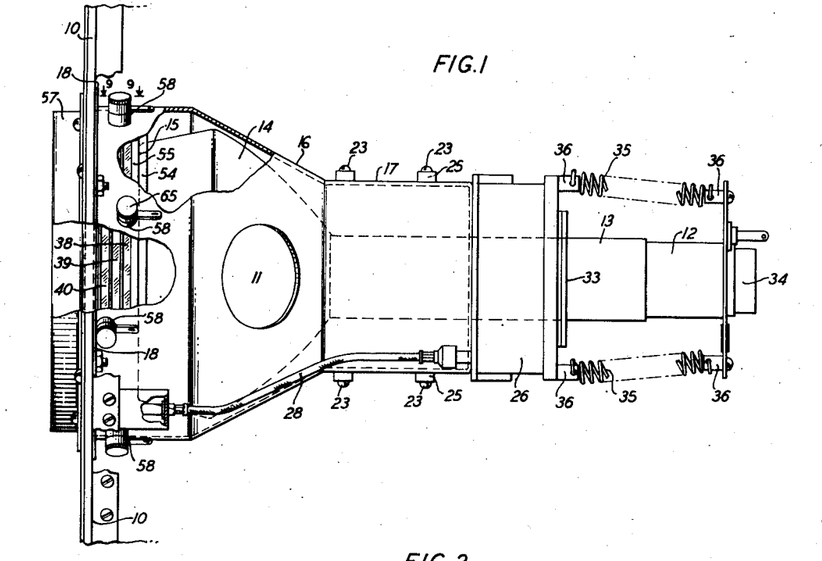
Fig. 1 is a side elevation view of the mounting assembly of this invention with portions of the casing broken away to show details of construction.
Figure 2:
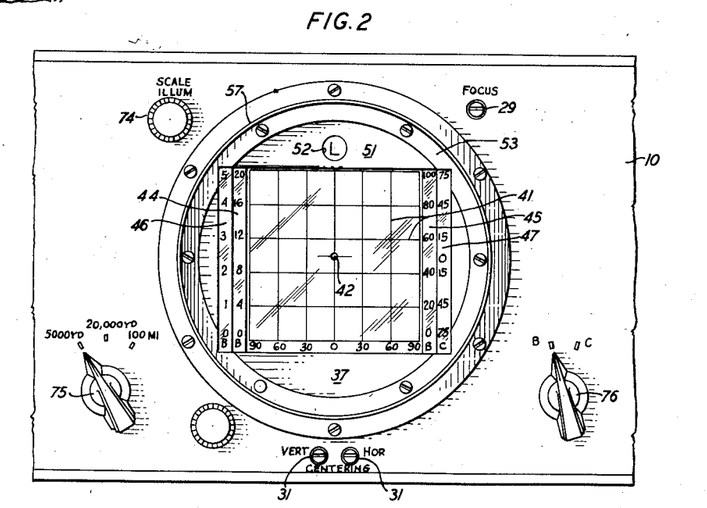
Fig. 2 illustrates a panel organization of this invention including the multiple scope mounting as viewed from the front of Fig. 1.

The mounting and indicatorscope in one aspect of this invention are adapted primarily for a cathode-ray tube employed in radio finder systems at a stationary point or in a moving vehicle, such as a ship or aircraft to search and track a target over large expanses of land or sea and over a large elevation range to indicate the presence of hostile forces. As shown in Figs. 1 and 2 the mounting and indicator are attached to a panel 10 extending in front of radio receiver equipment including a cathode-ray device or tube 11 having a terminal base portion 12 and an elongated neck portion 13 connected to a conical portion 14 which terminates in a flat end portion 15 having a fluorescent coating on the inner surface, which serves as a screen of the device. The neck portion encloses an electron gun, not shown, which projects an electron beam toward the screen on the end portion 15 to excite the fluorescent coating and the beam may be focussed to a sharp spot on the screen and variably deflected over the whole surface of the screen to indicate the location of the spot with respect to the axis of the tube.

In order to mount the tube 11 in suitable relation to a panel opening so that the screen may be viewed efficiently the tube is supported on the rear of the panel 10 by a metallic shell casing having an open truncated conical portion 16 enclosing the screen and portion 14 of the device and a cup-shaped portion 17 having an apertured end surrounding the neck portion 13 adjacent the portion 14. The casing is affixed to the panel by screws and nuts extending through a flange portion 18 projecting from the large diameter end of the casing and the tube 11 is coaxially mounted within the casing and extends horizontally from the rear of the panel 10.

Figure 3:
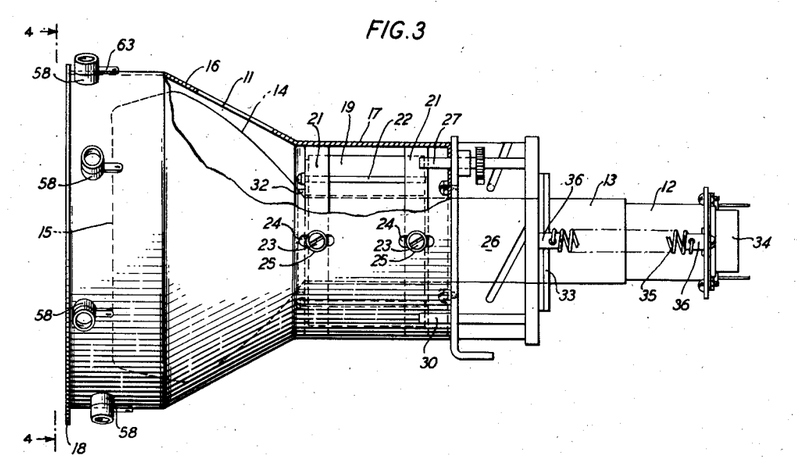
Fig. 3 is a top view in elevation of the assembly as shown in Fig. 1 except that the panel and scope are removed and a portion of the casing is cut away to show certain internal elements.
Figure 4:
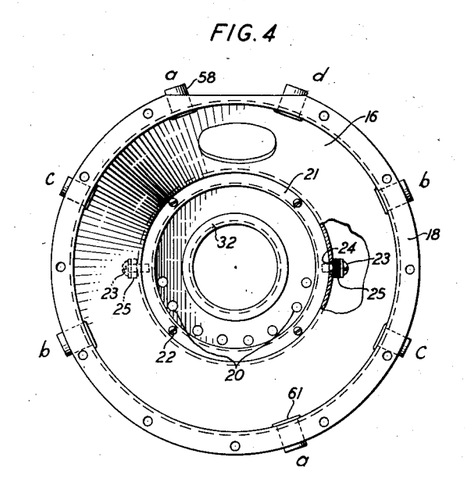
Fig. 4 is an end view of the casing taken on the line 4—4 of Fig. 3.
Figure 5:
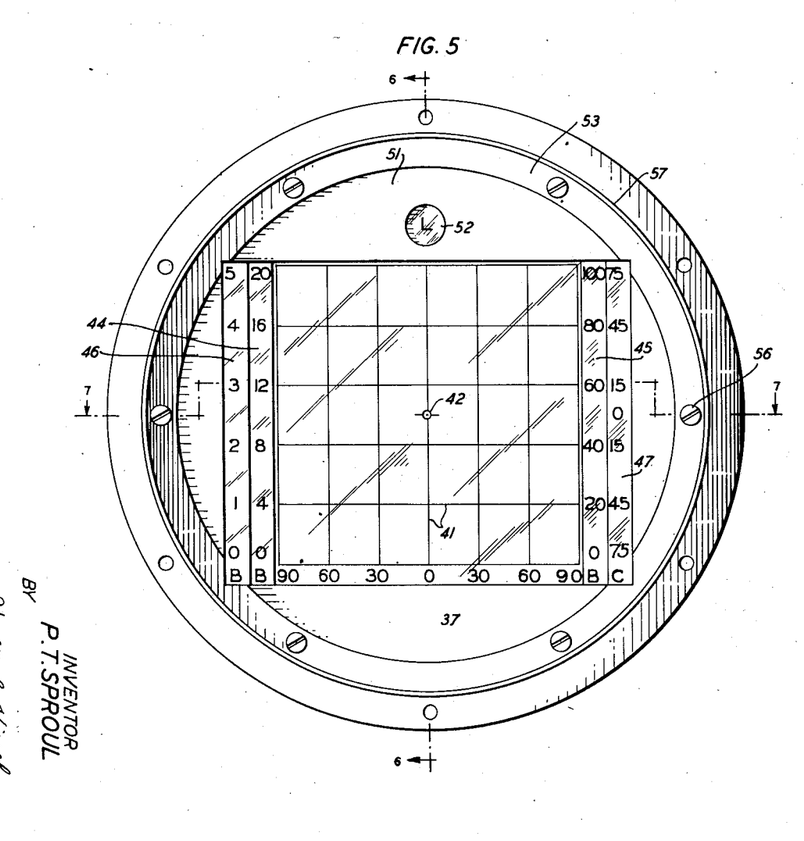
Fig. 5 is an enlarged front view of the multitple range scope of this invention.

An annular electromagnetic coil 19, shown in Figs. 3 and 4, is fitted into the cup portion 17 of the casing and surrounds the neck portion 13 of the tube to deflect the beam projected toward the screen of the device, the coil being provided with suitable terminals 20, Fig. 4, on the forward end, to apply various deflection voltages to the windings of the coil. The coil is also provided with metallic end collars 21 which clamp the coil therebetween by bolts 22. The coil is held within the casing by lock screws 23 extending through elongated slots 24 in the cup portion 17, the lock screws being insulated from the casing by bushings 25 and the inner ends of the screws being threaded in the collars 21 to rigidly position the coil in the casing. The deflection coil 19 may be adjustably controlled in rotational and horizontal relation to the device to position the coil in coaxial symmetry with the axis of the tube. When it is desired to adjust the coil longitudinally with respect to the neck portion of the tube 11, the lock screws are released from the collars so that the coil may be moved along the neck of the tube to secure the proper relation of the coil to the beam projected through the tube. The lock screws are then tightened to maintain the position of the coil in the casing. If it is desired to rotate the coil with respect to the tube axis the bolts 22 in the end collars are released whereupon the coil may be turned to the proper position and the bolts are then tightened to clamp the coil between the collars.

In addition to the magnetic deflection of the beam of the tube an annular adjustable focussing and centering permanent magnet structure 26 is mounted around the neck portion 13 of the tube and is supported on the apertured end of the cup portion 17 of the casing by screws. This structure is provided with a rotatable shaft 27 to control a shunt ring, not shown, to vary the magnetic field of the focussing magnet and a suitable flexible cable 28 connects this shaft to the panel, as indicated at 29, Fig. 2, to adjust the focussing of the spot appearing on the screen of the tube. The centering of the beam along the axis of the tube is controlled by a pair of rotatable shafts associated with the permanent magnet structure, one of which is shown at 30 in Fig. 3, and these shafts are coupled to flexible cables, not shown, which extend to the vertical and horizontal adjustments 31 on the lower central portion of the panel 10, as shown in Fig. 2.

Since the beam is susceptible to extraneous vibration which might cause erroneous indication of the spot on the screen, the tube 11 is resiliently supported in the casing to eliminate vibration and shock being transmitted to the tube. This is accomplished by providing a cushion ring 32, preferably of soft rubber, which engages the inner periphery of the coil at the forward end and the neck portion of the tube and forms a conical seat for the portion 14 of the tube. The neck portion of the tube is also centrally cushioned in the mounting by an elastic rubber ring 33 on the permanent magnet structure so that the tube is physically separated from the rigidly mounted casing by shock absorbing material which inhibits vibration disturbances affecting the movement of the beam within the long path in the tube. The adjustable focussing and centering magnet structure 26 is more fully disclosed and claimed in my copending application Serial No. 528,911, filed March 31, 1944, issued April 8, 1947 as Patent 2,418,487.

The base portion of the cathode-ray tube is further supported from the casing by a socket 34 which engages the terminals on the base 12 to facilitate circuit connections of the electrodes in the device to associate apparatus mounted behind the panel. The socket is resiliently attached to the magnet structure 26 by tension springs 35 secured to projection studs 36 on the socket and the magnet. This arrangement forms an efficient mounting assembly of the cathode-ray tube and the cooperating magnetic components which embrace the tube and facilitates the location of the screen of the tube in suitable relation to an opening in the panel, whereby the spot indication on the screen may be readily viewed and utilized in coordination with the further aspects of this invention.

The cathode-ray tube mounting involving the shell, socket, tube cushioning means and assembly of the magnetic structures associated with the tube, forms the subject-matter of Patent 2,435,613 issued February 10, 1948.

In order to interpret the deflection of the beam as it appears on the screen of the device, a transparent multiple scale or scope 37 is mounted in the opening of the panel in front of the cathode-ray tube, as shown in Figs. 1 and 2, the scope, in accordance with this invention, being in telescopic relation to the open end of the casing portion 16 to facilitate transmission of the fluorescent spot on the adjacent screen of the tube and to selectively illuminate various range areas of the scope depending on the searching and tracking operations being performed with the aid of the radio finder system.

The multiple indicator scope 37 of this invention is shown in more detail in Figs. 5 to 9, inclusive, and comprises a plurality of superimposed discs, layers or plates 38, 39 and 40 of transparent material, such as plastic resins of the methacrylate or polystyrene resin type, for instance "Lucite," "Plexiglas" or similar transparent resins having light transmission characteristics which adapt them to edge lighting effects where light transmission is parallel to the surface of the material to indirectly illuminate characters inscribed on the surface thereof. The disc 38 has a solid plane area to form a base plate and a coordinate scale 41 is centrally etched on the rear surface with the vertical lines designating radius to 90 degrees on either side of the central zero line and the horizontal lines dividing the scale into uniform areas which may be utilized for longitudinal ranges or elevation ranges, the center of the scale being etched with a marker 42 to indicate the azimuth line for elevation measurements. The correlation of the scale with the screen of the tube 11 allocates the fluorescent spot on the screen at a definite radius on the scale depending on the arcuate sweep of the movable antenna associated with the radio finder system so that instant indication is given to an observer. Furthermore, the centering controls on the magnet structure 26 permit the beam in the cathode-ray tube to be directed toward the screen so that the spot coincides with the central marker 42 on the scope which may not exactly coincide with the axis of the cathode-ray tube.

The second or intermediate disc 39 is the same size and thickness as the base plate 38 but is provided with a central rectangular cut-out portion so that the intermediate disc forms a stepped frame around the sides of the scale 41. The longitudinal portions of the disc 39 adjacent the cut-out portion are provided with range characters of different lengths, the left-hand range 44 being from 0 to 20,000 yards spaced at intervals coinciding with the horizontal lines of the scale and the right-hand range 45 being from 0 to 100 miles. The top disc 40, of similar shape, is provided with a large central cut-out portion to expose the scale and the range characters on the intermediate disc 39 and the left-hand portion adjacent the edge of the central cut-out opening is etched with a longitudinal range 46 from 0 to 5,000 yards in lateral and uniform spaced relation to the 20,000-yard range of disc 39. The right-hand portion of the disc 40 adjacent the cut-out opening is etched with an elevation range 47, the zero designation coinciding with the azimuth marker 42 and the range being from 0 to 75 miles over a 90-degree radius of the vertical position of the searching craft. The multiple ranges permit a large area to be scanned from a searching location either stationary or mobile and in cooperation with the common scale indicates the distance and elevation of a hostile target which is to be detected.

Figure 6:
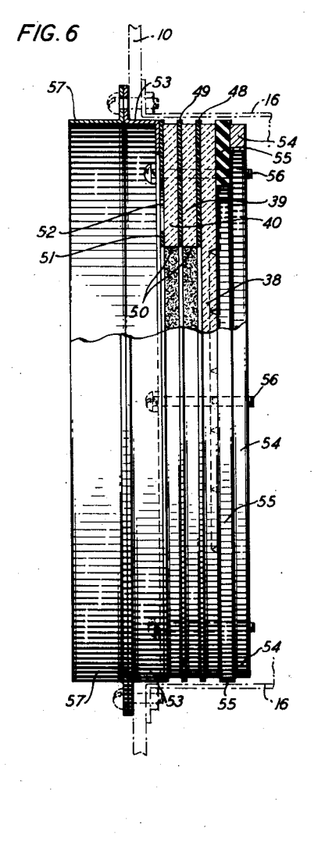
Fig. 6 illustrates a side view of the scope with a portion in cross-section taken from the section along line 6—6 of Fig. 5.
Figure 7:
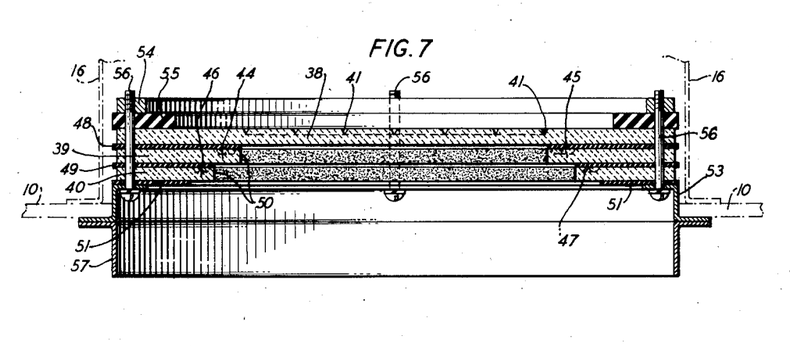
Fig. 7 is a cross-sectional view of the scope taken on the line 7—7 of Fig. 5 showing the opaque edges of the superimposed layers on the scale.

The superimposed layers or discs are segregated in lateral relation by opaque baffles, separators or partitions 48 and 49, preferably of pliable fibrous material, such as heavy paper or cardboard, although other opaque materials may be employed, such as resins or phenolic sheets or transparent films, such as nitrocellulose, or plastic resins having an opaque coating thereon which will attenuate light transmission between adjacent discs. The separators are slightly larger in diameter than the transparent discs so that the edges extend beyond the periphery of the discs and thereby form a circumferential gap between the pairs of baffles. The separators are also provided with rectangular cut-out portions which match the cut-out portions of the overlying discs so that the opaque baffle 49 does not obscure the range characters 44 and 45 on the intermediate disc 39 and the baffle 48 does not encroach upon the scale 41 of the base disc 38. In addition the edges of the cut-out portions of the plates 39 and 40 are provided with a black enamel coating 50 along the four sides, as shown in Figs. 6 and 7, to render these edges opaque to transmitted light rays. If the plates 38 to 40, inclusive, are cut from sheet material it will be necessary to grind and polish the peripheral edges to make them clear and transparent. An opaque mask 51 having a rectangular opening is superimposed on the top disc 40 and is provided with a circular aperture 52 which exposes a clear portion of the top disc 40 above the scale 41, the mask also extending beyond the edges of the top disc. The clear portion of the disc 40 exposed by the opening 52 in the top mask is employed as a warning signal to indicate to the observer and operator that the antenna has been rotated to its limits of travel of 180 degrees which conforms to the scale 41 on the scope. This arrangement produces a multiple scope in which the scale on the common disc is set back in a mounting wherein the superimposed layers or discs form a double frame assembly having divergent parallel step-like levels on opposite sides of the scale and the different ranges inscribed on the step-like levels may be selectively associated with the scale to indicate the position of the fluorescent spot appearing on the screen of the cathode-ray tube.

The multiple discs, baffles and mask in laminated assembly and accurately oriented to present the scale and the range and radius characters in their predetermined relation are combined into a unit or mount by an annular metallic bezel frame 53 placed over the front of the mask and having notches along the inner edge to correspond to the corners of the mask and a metallic ring 54 on the rear of the assembly. A rubber cushion ring 55 is clamped intermediate the base plate 39 and the ring 54 and the whole assembly is secured together by screws 56. A short metallic sleeve 57 projects in front of the bezel frame to form a socket for a hood, not shown, which may be utilized to shield the scope from external light reflection and to improve the contrast in viewing the scope. The flanges of the bezel frame and sleeve are attached to the panel 10, as shown in Figs. 1 and 2, with the multiple scope set in a circular opening of the panel in relation to the shell casing and tube 11, the scope being in telescopic relation in the open end of the shell, whereby the screen end 15 of the tube is seated against the cushion ring 55 of the scope unit. This arrangement aids in resiliently supporting the large end portion of the tube in the mounting and reduces the space relation between the flat screen of the tube and the base plate 38 of the scope, whereby reflection disturbances are eliminated.

The shell casing is provided in a plurality of miniature sockets 58 which are spaced around the periphery of the truncated conical portion 16 adjacent the flange 18 and extend radially from the exterior thereof in staggered relation, as shown in Fig. 1. These sockets support small lamps 59 which transmit illumination through the edges of the multiple discs 38 to 40, inclusive, to provide lighting of the scale and selection of the ranges desired to correspond to the searching indications exhibited on the screen of the tube and produced on the luminescent scale of the scope.

Figure 9:
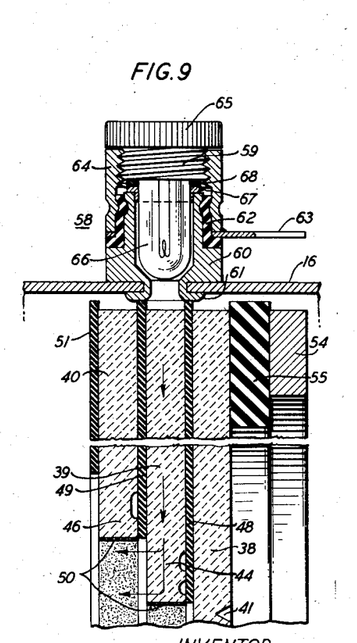
Fig. 9 is an enlarged detail view in cross-section of a portion of the assembly taken on the line 9—9 of Fig. 1 to illustrate the edge illumination of one of the layers of the multiple range scope of this invention.

The miniature socket 58 is shown in detail in Fig. 9 and consists of a metallic sleeve 60 having a small diameter extension 61 spun over the inner surface of the shell after passing through an aperture therein, the aperture being in line with the edge of one of the translucent discs of the scope and the spun extension being in shoulder contact with a pair of opaque partitions on opposite sides of the disc. A fiber insulating collar 62 having a flange portion surrounds the sleeve 60 and is seated thereon, the flange portion being engaged by a terminal lug 63 extending outwardly from the socket. A lamp receiving metallic sleeve 64 surrounds the collar and is crimped to the collar and sleeve 60 to securely fasten these parts and the terminal lug together as a unit. The sleeve 64 is internally threaded to accommodate the screw base of a lamp 59 which is inserted in the sleeve 60 and secured in sleeve 64 by turning the insulating knob 65 on the outer end of the base. The tungsten filament 66 of the lamp has one end connected to the screw base in contact with the sleeve 64 and terminal 63 and the other end is connected to an annular contact 67 surrounding the lamp bulb and insulated from the screw base by a washer 68, the contact engaging the end of the sleeve 60 which is grounded through the shell casing.

The sockets are staggered in relation around the periphery of the shell casing to concentrate the light projected through the edges of the discs, as shown in Fig. 9, so that illumination of one portion of one of the discs does not cause light radiation in the adjacent disc portion. Therefore, the staggering of the sockets allocates the light to definite portions of the discs and the selectivity of range areas can be more easily controlled. The arrangement of the sockets can be realized from a comparison of Figs. 4 and 8 in connection with Fig. 3 in which the sockets $a$—$a$ at the top left and bottom right are in line with the base plate 38 to illuminate the scale at all times during the searching operations of the system. The sockets $b$—$b$ are in line with the intermediate disc 39, the left-hand socket being directed towards the 20,000-yard range while the right-hand socket is directed toward the 100-mile range. The sockets $c$—$c$ are in line with the top disc 40, the upper left-hand socket being directed toward the 5,000-yard range and the lower right-hand socket being directed toward the elevation range on this disc. The socket $d$ at the top is also directed toward the top disc 40 to convey illumination to the opening 52 in the mask.

Figure 8:
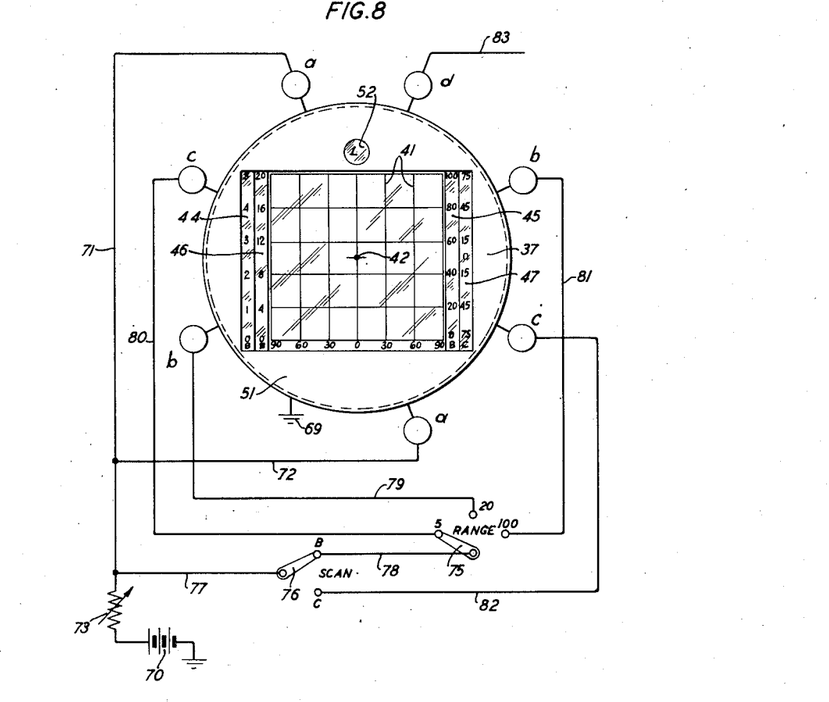
Fig. 8 is a diagrammatic view of the scope and lamp circuit associated therewith.

The selective operation of the multiple scope of this invention in combination with the mounting assembly of the cathode-ray tube 11 can be realized from Figs. 2 and 8 which show the operating controls on the panel and the circuit connections of the lamps associated with the various ranges of the scope. As shown in Fig. 8 the shell casing is grounded at 69 and a grounded battery 70 supplies the energy for all the lamps in the assembly. The scale 41 on the base disc 38 is fully illuminated by the lamps in sockets $a$—$a$ at the top and bottom of the casing in line with the disc by direct connection to the battery over conductors 71 and 72, respectively. The intensity of illumination may be controlled by a resistance 73 regulated by a dial or knob 74 on the panel 10. The selection of the desired range of search is controlled by switches 75 and 76 on the lower portion of the panel on opposite sides of the range scope. This selection is governed by the cooperative functional operation of the radio finder system for detecting a target within a designated area to produce an indication on the scale from the fluorescent screen of the cathode-ray tube which shows evidence of this discovery by the movement of the fluorescent spot on the screen.

Assuming it is desired to search a longitudinal area of 20,000 yards to detect a hostile target in this area, the scanning switch 76 is turned to the B position and the switch 75 is turned to the center contact on the panel. A circuit is completed through conductor 77, switch 76, conductor 78, switch 75 and conductor 79 to the lamp in the lower left-hand socket $b$ and thence to the casing and ground 69 to energize this lamp and illuminate the left-hand edge of the intermediate disc 39. The indirect lighting produced by the lamp is conveyed toward the inner edge of the cut-out portion of the disc to accentuate the search range of 0 to 20,000 yards along the left-hand margin of the scale 41. The opaque coating 50 on the inner edges of the cut-out portion of the intermediate disc 39 eliminates further transmission of light to the other side of the disc and the opaque baffles 48 and 49 on opposite surfaces of the disc restrict the illumination to the left-hand portion of the disc. At the same time the scale is illuminated by the lamps in sockets $a$—$a$ over conductors 71 and 72 and the base disc is fully lighted to accentuate the etched coordinate lines of the 180-degree scale thereon. The position of the target will be indicated at a definite distance and latitude on the coordinate scale and definite tracking operations can be instituted to attack the target, if hostile, or directions given to approach the target.

During the illumination of the 20,000-yard range the other ranges are blacked-out so that the light is concentrated on the designated range and the common scale. If the 5,000-yard or 100-mile range is to be used with the common scale it is only necessary to rotate the switch 75 either to the left-hand or right-hand contact on the panel to connect the battery to the lamps in socket c, upper left-hand position, or socket b in upper right-hand position, Fig. 8, to black out the 20,000-yard range and illuminate either the 0 to 5,000-yard or 0 to 100-mile ranges. In either event the individual range is illuminated by its individual lamp directed toward the edge of the disc over conductors 80 or 81 and the predetermined range is luminous alongside the scale 41.

If the searching involves elevation, such as a plane above or below the searching craft, the scanning switch 76 is turned to the C position whereby the battery is connected to conductor 82 through the switch to illuminate the lamp in socket c in the lower right-hand position of Fig. 8. Since this lamp is directed toward the right-hand edge of the top disc 40 the elevation range from 0 to 75 miles on either side of the azimuth marker 42 on the scale is illuminated along with the scale and the other ranges are darkened.

In addition to the various range indications presented on the multiple scope of this invention, a further important factor in the operation of the cathode-ray tube mounting is the radius limit of the scale in front of the tube. The searching and tracking procedure in detecting the presence of a target or hostile craft within the range of the radio finder system requires the manipulation of a movable or steerable antenna which receives echo signal pulses from the target or craft and in order to keep the radius of movement of the antenna within the radius of the scale it is essential that indication of the movement of the antenna be apparent to the operator, since in most applications the antenna is mounted in a position out of direct vision of the observing operator. This is accomplished by a separate lamp in socket d having a conductor 83 connected to the contacts, not shown, defining the 180-degree limits of travel of the antenna whereby movement of the antenna to either contact establishes an energizing circuit to the lamp which illuminates the upper portion of the top disc 40 through the edge lighting effect of the Lucite disc. However, since the lighting effect is substantially shrouded by the mask 51 and the opaque coating on the edge of the cut-out portion of the disc, the indication is intensified by the illumination of the unmasked portion of the disc provided by the opening 52 in the mask. This portion of the disc may be designated by the character L being etched on the surface to indicate limit of travel so that each time the antenna reaches its limit of travel over the arc, an indication will be given to apprise the observer to reverse its movement to keep the radius within the radius of the scale 41. A particular advantage of this feature is evident when no spot appears on the screen, since in this case the observer cannot rely on the travel of the spot across the scale. Therefore, regardless of the presence of a target in the designated area, it will be apparent that the travel radius of the antenna will be confined to the scale radius and confusion avoided in the operation of the radio finder system in association with the multiple scope.

While the above description has been confined to a specific construction of the cathode-ray tube mounting and scope of this invention, it is, of course, understood that various modifications may be made in the assembly with respect to the mounting and also the details of the scope, such as number of layers and the characters inscribed thereon, without departing from the spirit of the invention as defined in the appended claims.

What is claimed is:

1. In combination, a cathode-ray tube having a fluorescent screen on one end thereof activated by a beam of electrons, a metallic casing extending along a portion of the length of said tube, means for supporting said tube in said casing, a multiscale scope supported on said casing in front of the screen including a solid transparent plate and a plurality of similar plates having central cut-out portions superimposed over said solid plate, said similar plates having indicia along the lateral boundaries of said cut-out portions, and a plurality of lamps around the periphery of said casing to selectively illuminate said plates through the edges thereof.

2. In combination, a cathode-ray tube having a fluorescent screen on one end thereof, a metallic shell casing supporting said tube therein, a scale unit supported in front of said casing adjacent said screen, said unit including a transparent base plate having a coordinate scale thereon, a plurality of transparent layers having cut-out central portions superimposed on said base plate, each of said layers having multiple rows of characters along the rim of said cut-out portion cooperating with said coordinate scale, and a plurality of radially extending sockets disposed around the periphery of said shell casing adjacent said unit to contain lamps adapted to illuminate said base plate and selectively illuminate the rows of characters on said layers.

3. In combination, a cathode-ray tube having a fluorescent screen on one end thereof, a metallic shell casing supporting said tube therein, a scale unit supported in front of said casing adjacent said screen, said unit including a transparent base plate having a coordinate scale thereon, a plurality of transparent layers having cut-out central portions superimposed on said base plate, each of said layers having multiple rows of characters along the rim of said cut-out portions cooperating with said coordinate scale, opaque separators between said layers and base plate, said separators having portions extending beyond the periphery of said layers and plate, and a plurality of radially extending sockets disposed around the periphery of said shell casing adjacent said unit to contain lamps adapted to illuminate said base plate and selectively illuminate the rows of characters on said layers.

4. In combination, a cathode-ray tube having a fluorescent screen on one end thereof, a metallic shell casing supporting said tube therein, a scale unit supported in front of said casing adjacent said screen, said unit including a transparent base plate having a coordinate scale thereon, a plurality of transparent layers having cut-out central portions superimposed on said base plate, each of said layers having multiple rows of characters along the rim of said cut-out portions cooperating with said coordinate scale, opaque separators between said layers and base plate, a plurality of radially extending sockets disposed around the periphery of said shell casing adjacent said unit to contain lamps adapted to illuminate said base plate and selectively illuminate said rows of characters on said layers, a mask having a large rectangular opening superimposed on said layers, said mask having an aperture exposing a blank portion of said top layer, and an additional socket supported by said casing to contain a lamp adapted to illuminate said top layer in the vicinity of said aperture in said mask to indicate the limits of travel across the scale on said base plate.

5. In combination, a cathode-ray tube having a fluorescent screen on one end thereof, a metallic shell casing supporting said tube therein, a scale unit supported in front of said casing adjacent said screen, said unit including a transparent base plate having a coordinate scale thereon, a plurality of transparent layers having cut-out central portions superimposed on said base plate, each of said layers having multiple rows of characters along the rim of said cut-out portions cooperating with said coordinate scale, opaque separators between said layers and base plate, a plurality of radially extending sockets disposed around the periphery of said shell casing adjacent said unit to contain lamps adapted to illuminate said base plate and selectively illuminate said rows of characters on said layers, and an opaque coating on the edges of said cut-out portions to restrict luminescence to a designated row of characters on said layers.

6. In combination, a cathode-ray tube having a fluorescent screen on one end thereof, a metallic shell casing supporting said tube therein, a scale unit supported in front of said casing adjacent said screen, said unit including a transparent base plate having a coordinate scale thereon, a plurality of transparent layers having cut-out central portions superimposed on said base plate, each of said layers having multiple rows of characters along the rim of said cut-out portions cooperating with said coordinate scale, opaque separators between said layers and base plate, said separators having portions extending beyond the periphery of said layers and plate, and a plurality of radially extending sockets disposed in staggered relation around the periphery of said shell casing, said sockets being directed toward the edges of said layers and base plate and disposed between said separators in line with the characters along the rim of said cut-out portions and the scale on said base plate.

7. In combination, a cathode-ray tube having a fluorescent screen on one end, a metallic shell supporting said tube therein, a multirange transparent scope mounted on the open end of said casing adjacent said screen, said scope comprising a transparent base disc having a coordinate scale etched thereon, an intermediate disc superimposed on said base disc and having a rectangular cut-out portion framing said scale in set-back relation, said intermediate disc having range characters indicating different longitudinal lengths along the inner edges parallel to said scale, a top disc on said intermediate disc having a rectangular cut-out portion exposing said scale and the range characters of said intermediate disc, said top disc having longitudinal range characters on one edge of said cut-out portion parallel to the range characters on said intermediate disc and elevation characters along the opposite edge parallel to the other range characters on said intermediate disc, the right angle edges of said intermediate and top discs being coated with opaque material to restrict transmission of light beyond said edges, opaque insulating partitions interposed between said discs and having openings therein coinciding with the openings in the adjacent overlying disc, an opaque mask covering said top disc having a cut out portion exposing the characters and scale on said disc, and a plurality of lamps on the periphery of said casing and extending radially towards the edges of said discs to selectively illuminate the scale and the range and elevation characters on said discs.

8. A multirange indicator unit mounting adapted for cathode-ray devices having a fluorescent screen comprising a transparent plastic resin base plate having a coordinate scale thereon, a pair of plates of similar material superimposed on said base plate and having rectangular cut-out portions producing a stepped frame boundary about said scale, the stepped portions having different character groups inscribed thereon for use with said common scale and the edges of said cut-out portions perpendicular to said scale being opaque to transmitted light through said plates, opaque separating layers between adjacent plates having cut-out portions coinciding with the cut-out portions of the overlying plate and a peripherially extending portion forming a marginal gap adjacent the transparent edges of said plates, a metallic shell casing supporting said indicator unit and adapted to enclose the screen of said device, a plurality of sockets each having a metallic sleeve portion rigidly secured to said shell and directed towards the marginal gap including the edges of said plates, a flanged insulating collar surrounding said sleeve, a lamp receiving sleeve crimping said collar to said first sleeve, an outwardly extending terminal clamped between said receiving sleeve and collar, and lamps supported in the receiving sleeves selectively operated to illuminate the edges of said plates for transmission of light to predetermined character groups on said plates.

9. In combination, a cathode ray tube having a fluorescent screen on one end thereof, a metallic shell casing supporting said tube therein, a scale unit supported in front of said casing adjacent said screen, said unit including a transparent base plate, a plurality of similar plates superimposed thereon having cut-out portions in stepped relation on the lateral sides thereof, means obscuring light transmission between adjacent plates, rows of characters visible through said portions in stepped relation, a cushion member on the outer surface of said base plate, a supporting ring engaging said cushion member, and means affixing said plates to said ring.

10. In combination, a cathode ray tube having a fluorescent screen on one end thereof, a metallic shell casing supporting said tube therein, a scale unit supported in front of said casing adjacent said screen, said unit including a transparent base plate having a coordinate scale thereon, a plurality of similar plates superimposed thereon having cut-out portions in stepped relation on the lateral sides thereof, means obscuring light transmission between adjacent plates, rows of characters visible through said portions in stepped relation, a cushion ring on the outer surface of said base plate, a supporting ring engaging said cushion ring, means securing said plates to said supporting ring, and a front masking layer having a central cut-out portion exposing said scale and characters on said plates.

11. In combination, a cathode ray tube having a fluorescent screen on one end thereof, a metallic shell casing supporting said tube therein, a scale unit supported in front of said casing adjacent said screen, said unit including a transparent base plate, a plurality of similar plates superimposed thereon having cut-out portions in stepped relation on the lateral sides thereof, means obscuring light transmission between adjacent plates, means for masking the edges of said cut-out portions, rows of characters visible through said portions in stepped relation, a cushion member in contact with said base plate, and a metallic ring adjacent said cushion member and mounting said plates in a unitary assembly.

12. In combination, a cathode ray tube having a fluorescent screen on one end thereof, a metallic shell casing supporting said tube therein, a scale unit supported in front of said casing adjacent said screen, said unit including a transparent disc having a coordinate scale thereon, a plurality of similar discs having cut-out portions superimposed on said base disc, a plurality of sockets on said shell directed toward the edges of said discs, and opaque separators between said discs having rectangular openings defining the inner boundaries of said plates, said separators being of larger diameter than said discs to form connecting channels between said sockets and said discs.

13. In combination, a cathode ray tube having a fluorescent screen on one end, a metallic shell supporting said tube therein, a multirange transparent scope mounted on the open end of said casing adjacent said screen, said scope comprising a transparent base disc having a coordinate scale thereon, a plurality of similar discs superposed thereon having cut-out portions in stepped relation on the lateral sides thereof, opaque separators between adjacent discs, rows of characters visible through said portions in stepped relation, a plurality of sockets on said shell directed toward the edges of said disc, and an opaque coating on the inner edges of said discs with cut-out portions to cut off light transmission beyond said inner edges.

PHILIP T. SPROUL.

REFERENCES CITED

The following references are of record in the file of this patent:

UNITED STATES PATENTS

| Number | Name | Date |
|---|---|---|
| 2,022,175 | Allee | Nov. 26, 1935 |
| 2,158,925 | Braswell | May 16, 1939 |
| 2,159,328 | Horinstein | May 23, 1939 |
| 2,200,039 | Nicoll | May 7, 1940 |
| 2,234,720 | De Tar | Mar. 11, 1941 |
| 2,251,984 | Cleaver et al. | Aug. 12, 1941 |
| 2,330,604 | Messner | Sept. 28, 1943 |

FOREIGN PATENTS

| Number | Country | Date |
|---|---|---|
| 364,050 | Italy | Oct. 20, 1938 |
| 459,355 | Great Britain | Jan. 6, 1937 |
| 472,165 | Great Britain | Sept. 13, 1937 |